US007791381B2

(12) United States Patent
Ohyabu

(10) Patent No.: US 7,791,381 B2
(45) Date of Patent: Sep. 7, 2010

(54) SEMICONDUCTOR INTEGRATED CIRCUIT

(75) Inventor: Takashi Ohyabu, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/357,720

(22) Filed: Jan. 22, 2009

(65) Prior Publication Data

US 2009/0195274 A1 Aug. 6, 2009

(30) Foreign Application Priority Data

Feb. 4, 2008 (JP) ............................ 2008-024024

(51) Int. Cl.
*H03L 7/00* (2006.01)

(52) U.S. Cl. ...................................... 327/141; 327/292

(58) Field of Classification Search ................ 327/141, 327/153, 161, 292, 293, 295, 297, 565
See application file for complete search history.

(56) References Cited

U.S. PATENT DOCUMENTS

2007/0130486 A1 6/2007 Lindberg

FOREIGN PATENT DOCUMENTS

JP 3178371 6/2001
JP 2006-134215 5/2006

*Primary Examiner*—Lincoln Donovan
*Assistant Examiner*—Diana J Cheng
(74) *Attorney, Agent, or Firm*—McDermott Will & Emery LLP

(57) ABSTRACT

A semiconductor integrated circuit according to the present invention comprises a clock tree circuit for delay-adjusting a clock signal using various delay amounts, and a clock synchronizing circuit to which the delay-adjusted clock signal is supplied. The clock tree circuit comprises a first clock tree cell provided in a poststage of a clock signal introducing terminal, a second clock tree cell provided in a prestage of the clock synchronizing circuit and a poststage of the first clock tree cell, and a clock ramification point provided in a prestage of the second clock tree cell. The clock synchronizing circuit comprises a first clock synchronizing circuit to which the clock signal delay-adjusted by the second clock tree cell and thereafter outputted from the clock tree circuit is supplied, and a second clock synchronizing circuit to which the clock signal outputted from the clock tree circuit at the clock ramification point is supplied.

5 Claims, 2 Drawing Sheets

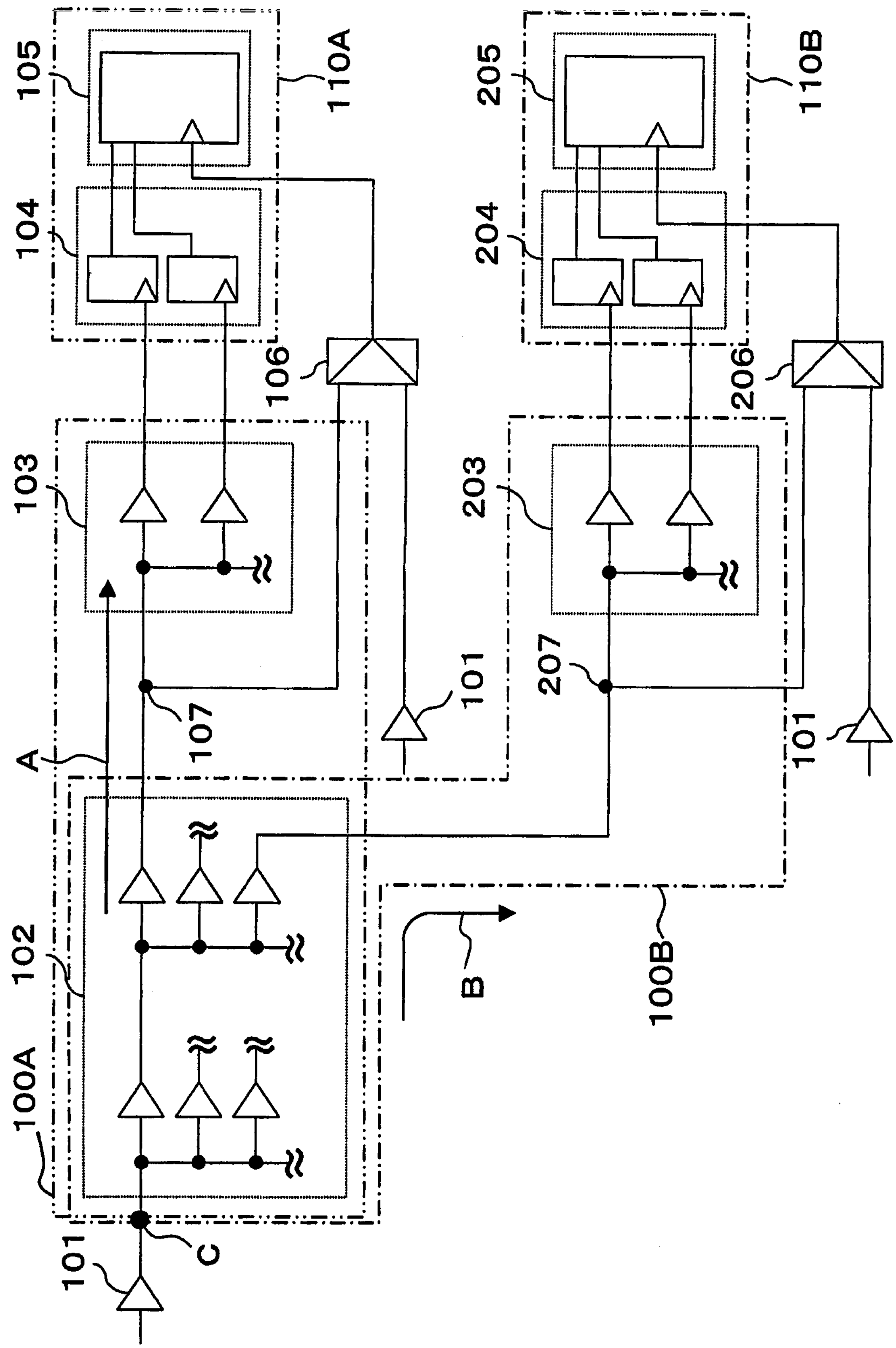
F I G. 1
105
110A
104
106
103
101
107
A
102
100A
101
C
B
100B
205
110B
204
206
203
207
101
101

SEMICONDUCTOR INTEGRATED CIRCUIT

BACKGROUND OF THE INVENTION

1. Field of the Invention

The present invention relates to a clock configuration for reducing an intra-chip clock delay variation in a clock synchronizing circuit of a semiconductor integrated circuit.

2. Description of the Related Art

In recent years, in the miniaturizing process of a semiconductor integrated circuit resulting from with a process shrink, an intra-chip clock delay variation due to the influence of the OCV (On-Chip-Variation) has caused serious problems such as the increase of man-hours in its manufacturing process, the deterioration of timing convergence in its characteristics, and area increase in its structure.

The OCV denotes an intra-chip clock delay variation generated in different clock paths in a clock synchronizing circuit which demands the adjustment of the clock delay. The OCV is induced by, for example, the following factors:

- processing variation in the manufacturing process
- inadequacy of the OPC (Optical-Proximity-Correction)
- temperature variation in the chip at the time of an operation
- variation of an IR-DROP value in each cell
- variation of the number of cell layers
- variation of a wiring shape
- variation of a design factor which depends on an actual operation
- other design margins The miniaturizing process requires such timing verification that the intra-chip clock delay variation due to the influence of the OCV is included in the design margins. In the case where the delay variation (an amount of variance) is 20%, for example, it is necessary to guarantee the operation frequency of 120 MHz in order to guarantee the operation frequency of 100 MHz.

In SRAM, ROM, dDRAM and the like (hereinafter, referred to as macros) which are custom-designed, it is conventionally necessary to set a hold time exceeding that of a flip-flop. Further, the area increase due to the OCV is eminent since these macros comprise a large number of input and output terminals.

It is a generally adopted configuration to provide a large number of macros to realize the reduction of chip costs and the improvement of performance. Therefore, the decline of productivity in the designing process, such as the increase of man-hours and the area increase, which is caused since the timing convergence between the flip-flops and the macros is deteriorated, is an issue that needs to be resolved.

FIG. 2 is an illustration of a conventional clock configuration. The clock configuration, in a semiconductor integrated circuit having a clock tree structure, comprises

- a clock tree source cell 1001 which supplies clock signals;
- a flip-flop 1004 and a macro 1005, which are circuits that require clock delay adjustment from the clock tree cell 1001;
- a clock selecting circuit 1006 which selects a clock signal and outputs the selected clock signal to the macro 1005;
- a first clock tree cell (ramified into a plurality of stages) 1002 which performs the clock delay adjustment in a poststage of the clock tree cell 1001;
- a second clock tree cell 1003 which performs the clock delay adjustment in a prestage of the flip-flop 1004 and the macro 1005; and
- a clock final ramification point 1007 at which a clock transmission path ramifies to the clock selecting circuit 1006 from the clock tree circuit.

A clock signal outputted from the clock tree source cell 1001 is amplified by the first clock tree cell 1002 and the second clock tree cell 1003 each ramified into a plurality of stages at the clock final ramification point 1007, and transmitted to the flip-flop 1004. This clock signal is further amplified by the first clock tree cell 1002 and the second clock tree cell 1003 each ramified into the plurality of stages after passing through the clock selecting circuit 1006 via the clock final ramification point 1007, and transmitted to the macro 1005. Therefore, the clock path from the clock tree source cell 1001 to the flip-flop 1004 and the clock path from the clock tree source cell 1001 to the macro 1005 are subjected to the clock delay adjustment by the first clock tree cell 1002 and the second clock tree cell 1003.

Accordingly, the clock final ramification point 1007 and the clock selecting circuit 1006 are placed in the prestage of the clock path in comparison to the first clock tree cell 1002 ramified into the plurality of stages, and the clock selecting circuit 1006 is placed in proximity to the clock tree source cell 1001. Therefore, the length of the clock path is different between the two after the clock final ramification point 1007. As a result, the intra-chip delay variation due to the OCV is increased, and the man-hour increase and the area increase caused by the deterioration of the timing convergence occur.

In order to solve the problem, a design method recited in Japanese Patent No. 3178371 was proposed. The design method centered around a group of flip-flops which receive clock signals generated by a gating clock circuit capable of reducing power consumption in a clock line, and a delay time difference (skew) generated in the group of flip-flops was lessened.

More specifically, the processes performed by the design method are as follows.

- In the gating clock circuit having a clock tree structure in which a route buffer, buffers in a plurality of stages which are sequentially ramified from the route buffer, and a final stage multi-input gate (NOR gate) are combined, these components are connected after all of cells are placed.
- After the flip-flops connected to the clock line are clustered on a function-by-function basis, and the flip-flops placed in proximity are further clustered relative to each other.

As a result, loads driven by the respective buffers and the multi-input gate can be constant, which lessens the skew.

In the conventional method described above, since the final multi-input gate is provided at the center of gravity coordinate of the flip-flops driven by the respective buffers, a complicated placement clustering process is required. Further, it is not possible for the method to flexibly deal with a macro subject to placement restrictions different to those of the flip-flop and a complicated clock selecting circuit configured in a manner different to the gating circuit.

SUMMARY OF THE INVENTION

Therefore, a main object of the present invention is to provide a semiconductor integrated circuit easily manufacturable and capable of responding to various macros and a clock selecting circuit.

In order to achieve the main object, a semiconductor integrated circuit according to the present invention comprises

- a clock tree circuit for delay-adjusting a clock signal transmitted through a clock path using various delay amounts; and
- a clock synchronizing circuit to which the clock signal delay-adjusted by the clock tree circuit is supplied, wherein the clock tree circuit comprises a first clock tree cell provided in a poststage of a clock signal introducing terminal in the clock path;

a second clock tree cell provided in a prestage of the clock synchronizing circuit and a poststage of the first clock tree cell in the clock path; and a clock ramification point provided in a prestage of the second clock tree cell and a poststage of the first clock tree cell in the clock path, wherein the clock synchronizing circuit comprises a first clock synchronizing circuit to which the clock signal delay-adjusted by the second clock tree cell and thereafter outputted from the clock tree circuit is supplied; and a second clock synchronizing circuit to which the clock signal not delay-adjusted by the second clock tree cell after delay-adjusted by the first clock tree cell and outputted from the clock tree circuit at the clock ramification point is supplied.

The clock ramification point and the second clock synchronizing circuit may be connected to each other without the clock tree circuit interposed therebetween in the semiconductor integrated circuit according to the present invention.

The semiconductor integrated circuit according to the present invention may further comprise a clock selecting circuit between the clock ramification point and the second clock synchronizing circuit, wherein the clock selecting circuit selects either the clock signal outputted from the clock tree circuit at the clock ramification point or another clock signal different to the clock signal and supplies the selected clock signal to the second clock synchronizing circuit.

An output signal from the first clock synchronizing circuit may be supplied to the second clock synchronizing circuit.

The first clock synchronizing circuit may be a memory cell.

The second clock synchronizing circuit may be a flip-flop.

According to the present invention, since the clock ramification point is provided in proximity to the first and second clock synchronizing circuits, influence of the OCV is reduced. Further, in the respective clock paths ramified at the clock ramification point, the common clock path makes up a larger proportion. Therefore, the intra-chip clock delay variation (an amount of variance) due to the influence of the OCV, which is to be taken into account as a design margin, can be reduced.

When the constitution in the present invention is further configured so that the clock ramification point and the second clock synchronizing circuit are connected to each other without the clock tree circuit interposed therebetween, a difference in delay amounts between the clock paths can be further lessened. As a result, the intra-chip clock delay variation due to the influence of the OCV can be further reduced.

Furthermore, when the constitution in the present invention is further configured so that the clock selecting circuit is provided between the clock ramification point and the second clock synchronizing circuit, and the clock selecting circuit selects either the clock signal delay-adjusted by the first clock tree cell and thereafter outputted from the clock tree cell at the clock ramification point or another clock signal different to the clock signal and supplies the selected clock signal to the second clock synchronizing circuit, the difference (variation) in th delay amounts in the clock paths can be reduced to a minimum level even when it is necessary to provide various clock-delay adjustments to the clock signals supplied from the clock tree source cell and the like.

Furthermore, when the constitution in the present invention is further configured so that in the output signal from the first clock synchronizing circuit is supplied to the second clock synchronizing circuit, data is transmitted and received between the first and second clock synchronizing circuits having the same clock tree structure. When the present invention is implemented under to such a constitution and in view of the timing convergence, the difference in the delay amounts between the clock paths can be reduced to a minimum level.

Furthermore, when the constitution in the present invention is further configured so that the first clock synchronizing circuit is a memory cell, complicated clock selection from among ordinary mode, scan mode, BIST mode, and burn-in mode can be made through the switching of the clock selecting circuit.

Furthermore, when the constitution in the present invention is further configured so that the second clock synchronizing circuit is a flip-flop, an area increase resulting from the intra-chip clock delay variation due to the influence of the OCV can be effectively controlled in a state where the signal is transmitted and received between a large number of flip-flops and the memory cell.

The circuit configuration according to the present invention aimed at the reduction of the intra-chip clock delay variation is characterized in that the common portions of the clock paths are increased in order to control the influence of the OCV, and is designed to avoid the decline of productivity in a designing process caused by the deterioration of the timing variation, area increase and the like due to the influence of the OCV. The circuit configuration according to the present invention is particularly effective in the case where a miniaturizing process is adopted, a large number of macros are provided and the cells are densely provided.

BRIEF DESCRIPTION OF THE DRAWINGS

These and other objects of the invention will become clear by the following description of preferred embodiments of the invention and be specified in the claims attached hereto. A number of benefits not recited in this specification will come to the attention of the skilled in the art upon the implementation of the present invention.

FIG. 1 is a circuit configuration according to a preferred embodiment of the present invention.

DETAILED DESCRIPTION OF THE INVENTION

Figure 2:
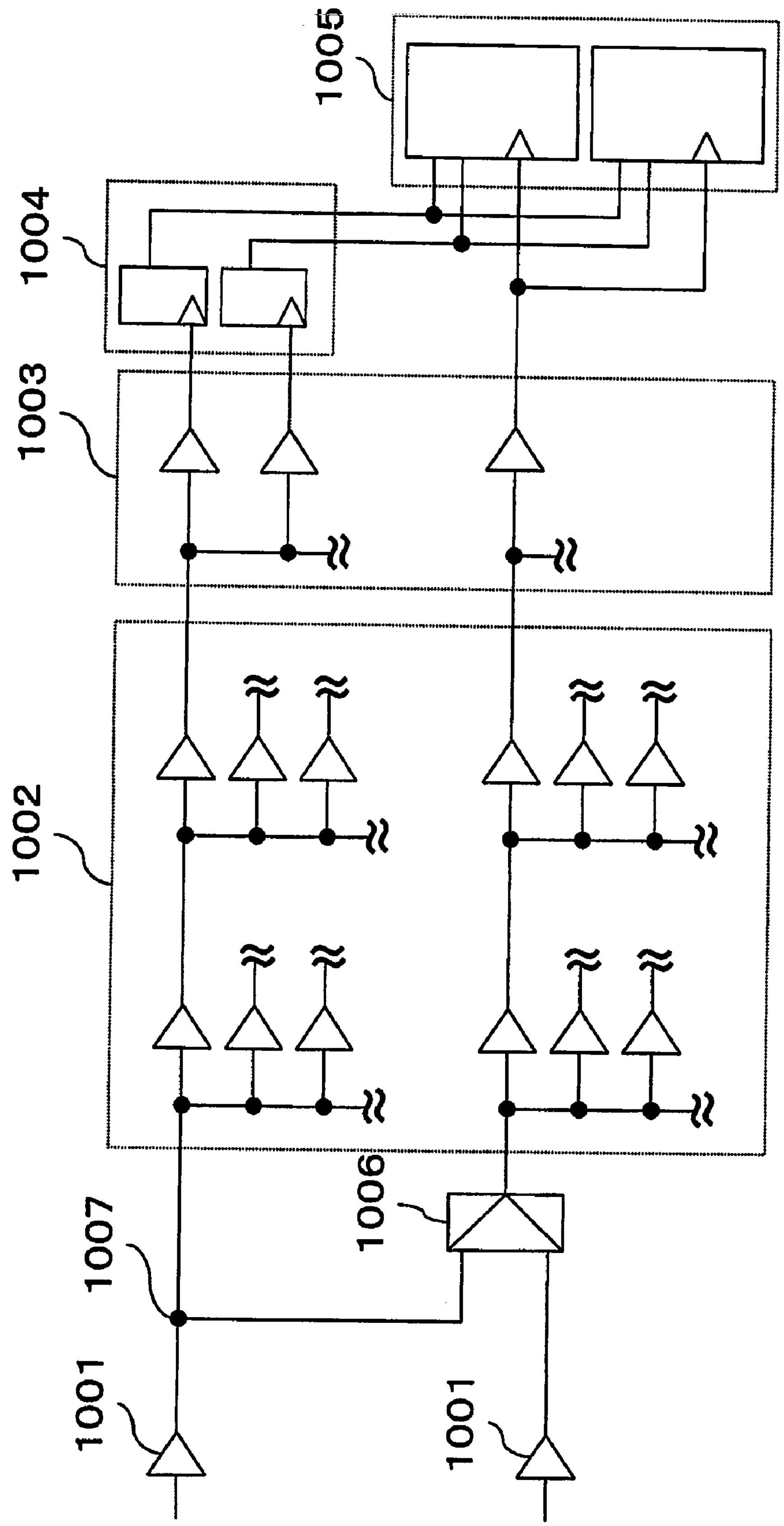
FIG. 2 is a conventional circuit configuration.

Hereinafter, a circuit configuration aimed at the reduction of an intra-chip clock delay variation, which is a preferred embodiment of the present invention, is described referring to FIG. 1. A semiconductor integrated circuit according to the preferred embodiment has a clock tree structure illustrated below. More specifically, the semiconductor integrated circuit comprises a clock tree source cell 101, first and second clock paths A and B to which a clock signal is supplied from the clock tree source cell 101, first and second clock tree circuits 100A and 100B respectively provided in the first and second clock paths A and B, first and second clock synchronizing circuit groups 110A and 110B to which the clock signal delay-adjusted by the first and second clock tree circuits 100A and 100B is respectively supplied, and first and second clock selecting circuits 106 and 206.

The first clock tree circuit 100A provided in the first clock path A comprises a first clock tree cell 102, a second clock tree cell 103 and a first clock ramification point 107. In a similar manner, the second clock tree circuit 100B provided in the second clock path B comprises the first clock tree cell 102, a second clock tree cell 203 and a second clock ramification point 207. The first clock tree cell 100A and the second clock tree circuit 100B share the first clock tree cell 102.

In the first clock tree circuit 100A, the first clock tree cell 102, second clock tree cell 103 and first clock ramification point 107 are placed as follows. The first clock tree cell 102 is provided in a poststage of a clock signal introducing terminal C in the first clock path A. The second clock tree cell 103 is provided in a prestage of the first clock synchronizing circuit group 110A and a poststage of the first clock tree cell 102. The first clock ramification point 107 is provided in a prestage of the second clock tree cell 103 and a poststage of the first clock tree cell 102.

The first clock tree cell 102 is ramified into a plurality of stages, and delay-adjusts the clock signal generated in the clock tree cell 101 and supplied to the clock signal introducing terminal C using various delay amounts to thereby generate a plurality of clock signals.

The first clock ramification point 107 is a ramification point of the clock signal delay-adjusted by the first clock tree cell 102, and is placed between the first clock tree cell 102 and the second clock tree cell 103 in the first clock path A. The clock signal ramified at the first clock ramification point 107 is respectively outputted to the second clock tree cell 103 and the first clock selecting circuit 106.

The second clock tree cell 103 is ramified into a plurality of stages, and further delay-adjusts the clock signal delay-adjusted by the first clock tree cell 102 and ramified at the first clock ramification point 107 using various delay amounts to thereby generate a plurality of clock signals.

The first clock selecting circuit 106 selects either the clock signal generated by the clock tree source cell 101 or the clock signal delay-adjusted by the first clock tree cell 102 and thereafter ramified at the first clock ramification point 107, and outputs the selected clock signal.

In the second clock tree circuit 100B, the first clock tree cell 102, second clock tree cell 203 and second clock ramification point 207 are placed as follows. The first clock tree cell 102 is provided in a poststage of the clock signal introducing terminal C in the second clock path B. The second clock tree cell 203 is provided in a prestage of the second clock synchronizing circuit group 110B and a poststage of the first clock tree cell 102. The second clock ramification point 207 is provided in a prestage of the second clock tree cell 203 and the poststage of the first clock tree cell 102.

The first clock tree cell 102 in the second clock tree circuit 100B is the first clock tree cell 102 in the first clock tree circuit 100A, and its configuration was described earlier.

The second clock ramification point 207 is a ramification point of the clock signal delay-adjusted by the first clock tree cell 102, and is placed between the first clock tree cell 102 and the second clock tree cell 203 in the second clock path B. The clock signal ramified at the second clock ramification point 207 is respectively outputted to the second clock tree cell 203 and the second clock selecting circuit 206.

The second clock tree cell 203 is ramified into a plurality of stages. The second clock tree cell 203 further delay-adjusts the clock signal delay-adjusted in the first clock tree cell 102 and ramified at the second clock ramification point 207 using various delay amounts to thereby generate a plurality of clock signals.

The second clock selecting circuit 206 selects either the clock signal generated by the clock tree source cell 101 or the clock signal delay-adjusted by the first clock tree cell 102 and thereafter ramified at the second clock ramification point 207, and outputs the selected clock signal.

In the illustration in FIG. 1 and the description given below, a group of clock signals in two series among the plurality of clock signals generated by the first clock tree cell 102 are picked up, the transmission paths of the group of clock signals are called the first clock path A and the second clock path B, and then, the first and second clock tree circuits 100A and 100B placed on the clock paths A and B are described. However, it is needless to say that the description given below is also applied to clock paths for groups of signals of other series which were not picked up.

The first clock synchronizing circuit group 110A is provided on the first clock path A, and comprises a first flip-flop (first clock synchronizing circuit) 104 and a first macro (second clock synchronizing circuit) 105. The first flip-flop 104 is the clock synchronizing circuit to which the clock signal delay-adjusted by the second clock tree circuit 100B of the first clock tree circuit 100A is supplied. The first macro 105 is the macro circuit which provides various types of processing to the clock signal processed by the first flip-flop 104. It is necessary to provide the clock signal supplied to the first macro 105 with a delay adjustment different to that provided to the clock signal supplied to the first flip-flop 104. Therefore, the clock signal which is different to a clock signal supplied to the first flip-flop 104 and selected by the first clock selecting circuit 106 is supplied to the first macro 105.

The second clock synchronizing circuit group 110B is provided on the second clock path B, and comprises a second flip-flop (second clock synchronizing circuit) 204 and a second macro (second clock synchronizing circuit) 205. The second flip-flop 204 is the clock synchronizing circuit to which the clock signal delay-adjusted by the second clock tree circuit 200B of the second clock tree circuit 100B is supplied. The second macro 205 is the macro circuit which provides various types of processing to the clock signal processed by the second flip-flop 204. It is necessary to provide the clock signal supplied to the second macro 205 with a delay adjustment different to that provided to the clock signal supplied to the second flip-flop 204. Therefore, the clock signal which is different to a clock signal provided to the second flip-flop 204 and selected by the second clock selecting circuit 206 is supplied to the second macro 205.

A plurality of clock signals are generated by the second clock tree cells 103 and 203, and the description below is given referring to one of the clock signals. However, it is needless to say that the description is also applied to the other clock signals.

First, the first and second clock ramification points 107 and 207 are described below. The first and second macros 105 and 205 are driven under clock control different to that used for the first and second flip-flops 104 and 204. Therefore, the first and second clock selecting circuits 106 and 206 are provided respectively in a prestage of and in close proximity to the first and second macros 105 and 205 in the first and second clock paths A and B. Accordingly, the first and second clock ramification points 107 and 207 are the final clock ramification points respectively in the first and second clock paths A and B.

Thus, the first and clock final ramification points 107 and 207 are provided respectively in the first and second macros 105 and 205 comprising the first and second clock selecting circuits 106 and 206 respectively. In the first and second flip-flops 104 and 204 and the first and second macros 105 and 205 where a data signal is transmitted and received, a part of the clock paths from the clock tree source cell 101 to the first and second clock ramification points 107 and 207 is a common clock path. As the ratio of the common clock path to the entire clock paths is larger, the intra-chip clock delay variation due to the influence of the OCV is smaller.

The data signal transmission and reception does not occur between the first flip-flop 104 and the second macro 205. In a similar manner, the data signal transmission and reception does not occur between the second flip-flop 204 and the first macro 105. Therefore, it becomes unnecessary to guarantee the timing between them in the constitution according to the present preferred embodiment, which makes it unnecessary to consider the intra-chip clock delay variation due to the influence of the OCV between them.

A layout flow for realizing the present preferred embodiment is described below. Prior to the layout of the cells including the first and second flip-flops 104 and 204, a floor plan is examined in view of the flow of data signals functional blocks, placement of IO terminals, wiring convergence, timing convergence and the like, so that the layout of the first and second macros is decided.

Next, the first clock selecting circuit 106 is provided in proximity to the first macro 105, and the second clock selecting circuit 206 is provided in proximity to the second macro 205. Then, the cells including the first and second flip-flops 104 and 204 are placed. More specifically, since a data signal is transmitted and received between the first flip-flop 104 and the first macro 105, it is necessary to taken the timing convergence into account. Therefore, the first flip-flop 104 is provided in proximity to the first macro 105. Accordingly, the first flip-flop 104 serves as the same clock tree clustering at and after the first clock ramification point 107. In a similar manner, since the data signal is transmitted and received between the second flip-flop 204 and the second macro 205, it is necessary to taken the timing convergence into account. Therefore, the second flip-flop 204 is provided in proximity to the second macro 205. Accordingly, the second flip-flop 204 serves as the same clock tree clustering at and after the second clock ramification point 207.

In the first clock path A from the clock tree source cell 101 to the first flip-flop 104 and the second clock path B from the clock tree source cell 101 to the second flip-flop 204, the CTS (Clock-Tree-Synthesis) processing for adjusting the clock delay is performed. As a result, the circuit configuration according to the present preferred embodiment illustrated in FIG. 1 can be realized.

Because the first clock selecting circuit 106 is provided in proximity to the first macro 105, the clock signal outputted from the first clock selecting circuit 106 can be correctly transmitted to the first macro 105 in the absence of the first clock tree cell 103 between the first clock selecting circuit 106 and the first macro 105. In a similar manner, because the second macro selecting circuit 206 is provided in proximity to the second macro 205, the clock signal outputted from the second macro selecting circuit 206 can be correctly transmitted to the second macro 205 in the absence of the second clock tree cell 203 between the second macro selecting circuit 206 and the second macro 205.

In FIG. 1, the clock signal outputted from the clock tree source cell 101 is amplified by the first clock tree cell 102 ramified in a plurality of stages, and transmitted to the first flip-flop 104 and the first clock selecting circuit 106 via the first clock ramification point 107. Further, the clock signal outputted from the first clock selecting circuit 106 is transmitted to the first macro 105.

The clock signal supplied from the clock tree source cell 101 to the first flip-flop 104 and the first macro 105 is delay-adjusted by the first clock tree cell 102 and the second clock tree cell 103 each ramified in a plurality of stages, and then supplied to the first flip-flop 104 and the first macro 105. Accordingly, the first clock ramification point 107 is placed in a later stage than the first clock tree cell 102 ramified in the plurality of stages, and the first clock selecting circuit 106 is placed in proximity to the first macro 105.

In a similar manner, in FIG. 1, the clock signal outputted from the clock tree source cell 101 is amplified by the first clock tree cell 102 ramified in the plurality of stages, and transmitted to the second flip-flop 204 and the second macro selecting circuit 206 via the second clock ramification point 207. Further, the clock signal outputted from the second macro selecting circuit 206 is transmitted to the second macro 205.

The clock signal supplied from the clock tree source cell 101 to the second flip-flop 204 and the second macro 205 is delay-adjusted by the first clock tree cell 102 and the second clock tree cell 103 each ramified in the plurality of stages, and then supplied to the second flip-flop 204 and the second macro 205. Accordingly, the second clock ramification point 207 is placed in a later stage than the first clock tree cell 102 ramified in the plurality of stages, and the second macro selecting circuit 206 is placed in proximity to the second macro 205.

Below are described the layout distances between the first and second clock selecting circuits 106 and 206 and the first and second macros 105 and 205. Below is given a description based on the following example in a 65-nm process as a miniaturizing process.

The first clock tree cell 102 is interposed between the clock tree source cell 101 and the first and second macros 106 and 206.

A total wiring length is 2,000 um.

A clock arrival time is 2.0 ns.

In the conventional circuit configuration, the first clock selecting circuit 1006 is provided in proximity to the clock tree source cell 1001. Therefore, the intra-chip clock delay variation (an amount of variance) generated in the clock paths (2,000 um) other than the common clock path is 0.4 ns based on the fact that the 20% OCV influence arises with respect to the clock arrival time (2.0 ns) provided that:

The distance between the clock selecting circuit 1001 and the macro 1005 is 2,000 um.

The intra-chip clock delay variation (an amount of variance) due to the influence of the OCV is 20%.

On the other hand, in the circuit configuration according to the present invention, the intra-chip clock delay variation (an amount of variance) due to the influence of the OCV is 10% provided that the distance between the first and second clock selecting circuits 106 and 206 and the first and second macros 105 and 205 is set to at most 200 um. As a result, the intra-chip clock delay variation is 0.02 ns based on the fact that the 10% OCV influence arises with respect to the clock arrival time (2.0 ns) in the clock paths (2000 um) other than the common clock path.

Thus, in the constitution according to the present preferred embodiment, since the distance between the first and second macros 105 and 205 and the first and second clock ramification points 107 and 207 (more specifically, first and second clock selecting circuits 106 and 206) is set to be shorter than in the conventional circuit configuration, the influence of the OCV is reduced, and the ratio of the common clock path is increased. As a result, the intra-chip clock delay variation (an amount of variance) due to the influence of the OCV which should be considered as design margins can be reduced.

Furthermore, in the present preferred embodiment, when the first and second clock selecting circuits 106 and 206 are provided, the second clock tree cells 103 and 203 are removed in the clock paths between the first and second clock selecting circuits 106 and 206 and the first and second macros 105 and

205. Therefore, the first and second clock selecting circuits 106 and 206 can be placed in closer proximity to the first clock tree cell 102.

As a result, any difference in delays between the respective clock paths can be reduced to a minimum level, and the intra-chip clock delay variation due to the influence of the OCV can be further reduced.

Thus, in the constitution according to the present preferred embodiment, wherein the first and second clock ramification points 107 and 207 (more specifically, first and second clock selecting circuits 106 and 206) are placed in closer proximity to the first and second macros 105 and 205 in comparison to the conventional circuit configuration, the influence of the OCV is reduced, and the ratio of the common clock path is increased.

As a result, the intra-chip clock delay variation due to the influence of the OCV which should be considered as design margins can be reduced.

Further, when the first and second clock selecting circuits 106 and 206 are provided in the present preferred embodiment, the second clock tree cells 103 and 203 are removed from between the first and second clock selecting circuits 106 and 206 and the first and second macros 105 and 205. Therefore, the first and second clock selecting circuits 106 and 206 can be placed in closer proximity to the first clock tree cell 102. As a result, any difference in delays between the respective clock paths can be reduced to a minimum level, and the intra-chip clock delay variation due to the influence of the OCV can be further reduced.

The description of the present preferred embodiment focused on the reduction of the clock delay variation due to the influence of the OCV. The conventional technologies can easily realize a clock delay adjustment in which a conventional buffer or an inverter is used, and a clock delay adjustment in which a macro having a longer hold time is supplied with a clock faster than that of another clock synchronizing circuit.

The macro recited in the present preferred embodiment denotes a memory cell such as SRAM, ROM, or eDRAM, which demands the hold time a few times as long as that of a flip-flop. Further, the macro effectively contributes to the control of an area increase, which is an object of the present invention, because a data signal is transmitted and received between the macro and a large number of flip-flops such as an address terminal, a data terminal, a control terminal and the like.

The connection between the clock selecting circuit and the macro is not necessarily one for one connection. In the case where the second clock tree cells 103 and 203 which amplify the clock signal are unnecessary, a similar effect can be obtained such that the clock signal outputted from the first and second clock selecting circuits 106 and 206 is connected to a plurality of macros, in which case the number of the clock selecting circuits can be reduced.

The first and second clock selecting circuits 106 and 206 include simple gating cells, and they can be easily anticipated by the ordinarily skilled in the art.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A semiconductor integrated circuit comprising:

a clock tree circuit for delay-adjusting a clock signal transmitted through a clock path using various delay amounts; and a clock synchronizing circuit to which the clock signal delay-adjusted by the clock tree circuit is supplied, wherein the clock tree circuit comprises:

a first clock tree cell provided in a poststage of a clock signal introducing terminal in the clock path;

a second clock tree cell provided in a prestage of the clock synchronizing circuit and a poststage of the first clock tree cell in the clock path; and a clock ramification point provided in a prestage of the second clock tree cell and a poststage of the first clock tree cell in the clock path, wherein the clock synchronizing circuit comprises:

a first clock synchronizing circuit to which the clock signal delay-adjusted by the second clock tree cell and thereafter outputted from the clock tree circuit is supplied; and a second clock synchronizing circuit to which the clock signal not delay-adjusted by the second clock tree cell after delay-adjusted by the first clock tree cell and outputted from the clock tree circuit at the clock ramification point is supplied, wherein the clock ramification point and the second clock synchronizing circuit are connected to each other without the clock tree circuit interposed therebetween.

2. The semiconductor integrated circuit as claimed in claim 1, further comprising a clock selecting circuit between the clock ramification point and the second clock synchronizing circuit, wherein the clock selecting circuit selects either the clock signal outputted from the clock tree circuit at the clock ramification point or another clock signal different to the clock signal and supplies the selected clock signal to the second clock synchronizing circuit.

3. The semiconductor integrated circuit as claimed in claim 1, wherein an output signal from the first clock synchronizing circuit is supplied to the second clock synchronizing circuit.

4. The semiconductor integrated circuit as claimed in claim 1, wherein the first clock synchronizing circuit is a memory cell.

5. The semiconductor integrated circuit as claimed in claim 1, wherein the second clock synchronizing circuit is a flip-flop.

* * * * *